United States Patent [19]

Henk et al.

[11] Patent Number: 5,093,481

[45] Date of Patent: Mar. 3, 1992

[54] FIBER REACTIVE AZO DYESTUFFS

[75] Inventors: Hermann Henk, Cologne; Karl-Josef Herd; Frank-Michael Stöhr, both of Odenthal, all of Fed. Rep. of Germany

[73] Assignee: Bayer Aktiengesellschaft, Leverkusen, Fed. Rep. of Germany

[21] Appl. No.: 275,441

[22] Filed: Nov. 23, 1988

[30] Foreign Application Priority Data

Dec. 1, 1987 [DE] Fed. Rep. of Germany ....... 3740649

[51] Int. Cl.$^5$ .................. C09B 62/51; D06P 1/384
[52] U.S. Cl. ..................... 534/632; 534/635
[58] Field of Search ............... 534/632, 635, 642, 638

[56] References Cited

U.S. PATENT DOCUMENTS

| | | | |
|---|---|---|---|
| 4,341,699 | 7/1982 | Tezuka et al. | 534/642 X |
| 4,540,418 | 9/1985 | Otake et al. | 534/642 X |
| 4,560,388 | 12/1985 | Rohrer | 534/642 |
| 4,649,193 | 3/1987 | Meininger et al. | 534/635 X |
| 4,725,675 | 2/1988 | Meininger et al. | 534/642 X |
| 4,908,436 | 3/1990 | Scheibli | 534/632 X |
| 4,935,501 | 6/1990 | Tzikas | 534/632 X |

FOREIGN PATENT DOCUMENTS

| | | | |
|---|---|---|---|
| 0111830 | 6/1984 | European Pat. Off. | 534/642 |
| 167490 | 1/1986 | European Pat. Off. | 534/642 |
| 0177445 | 4/1986 | European Pat. Off. | 534/642 |
| 3245525 | 6/1984 | Fed. Rep. of Germany | 534/642 |
| 45-10789 | 4/1970 | Japan | 534/642 |
| 60-215070 | 10/1985 | Japan | 534/642 |

OTHER PUBLICATIONS

JA 61/123671, "New reactive triazinyl-amino and sulphonyl substd . . . ", (Ciba) Abstract, J6-F, p. 3.
JA 59/115361, "Water soluble phenyl or naphthyl-mono:azo . . . ", (Fahr), Abstract, J5-F, p. 19.

Primary Examiner—Mary C. Lee
Assistant Examiner—Fiona T. Powers
Attorney, Agent, or Firm—Sprung Horn Kramer & Woods

[57] ABSTRACT

Dyestuffs of the formula

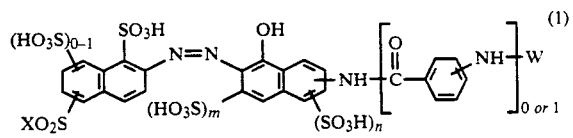

where the substituents have the meanings indicated in the description produce on hydroxyl- and amido-containing materials dyeings of excellent fibre-dyestuff bond stability, excellent stability to oxidizing agents and good wet fastness properties.

4 Claims, No Drawings

FIBER REACTIVE AZO DYESTUFFS

The invention relates to fibre-reactive azo dye-stuffs of the formula (I)

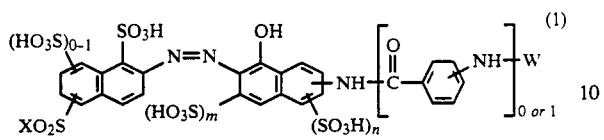

wherein
 m=0 or 1,
 n=0 or 1, with m+n=1 or 2,
 X=vinyl or $CH_2CH_2$—Y where Y represents a radical detachable under alkaline conditions,
 W=radical of the formula

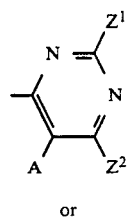

or wherein
 A=H, Cl, Br, CN or $C_1$-$C_4$-alkylsulphonyl,
 $Z^1$, $Z^2$=independently of each other H, Cl, Br, F or $C_1$-$C_4$-alkylsulphonyl although $Z^1$ and $Z^2$ do not simultaneously stand for H or $C_1$-$C_4$-alkylsulphonyl,
 $R^1$=H or an optionally substituted $C_1$-$C_4$-alkyl or cycloaliphatic radical, and
 $R^2$=$R^1$ or an optionally substituted benzyl, naphthyl or hetaryl radical, an optionally substituted phenyl radical which is free of $SO_3H$ or $SO_2X$ groups, or an optionally substituted amino group.

Examples of radicals Y are: $OSO_3H$, $SSO_3H$, $OCOCH_3$, $OPO_3H_2$, $OSO_2CH_3$, SCN, $NHSO_2CH_3$, Cl, Br, F, $OCOC_6H_5$ $OSO_2$—$C_6H_4$—$CH_3$, $N(CH_3)_3^{\oplus}Cl^{\ominus}$.

Examples of pyrimidine radicals W of the formula (2) are: 2,4-dichloro-6-pyrimidinyl, 2,4,5-trichloro-6-pyrimidinyl, 2-fluoro-4-pyrimidinyl, 2,4-dichloro-5-cyano-6-pyrimidinyl, 2,4-dichloro-5-methylsulphonyl-6-pyrimidinyl, 2,6-difluoro-5-chloro-4-pyrimidinyl, 2,6-difluoro-5-methyl-sulphonyl-4-pyrimidinyl, 2,6-difluoro-4-pyrimidinyl, 5-chloro-2-fluoro-6-methylsulphonyl-4-pyrimidinyl, 2,5-dichloro-6-fluoro-4-pyrimidinyl and 6-fluoro-5-chloro-4-pyrimidinyl radicals.

Suitable substituents for the radicals $R^1$ and $R^2$ are in particular OH, Cl, Br, F, CN, $CO_2H$, $SO_3H$, $OSO_3H$, $C_1$-$C_4$-alkoxy, $C_1$-$C_4$-alkyl, $N(CH_3)_2$, $NHCOCH_3$ $SO_2X$ and $SO_2X$-substituted $C_1$-$C_4$-alkoxy, the phenyl radicals being free of $SO_3H$ and $SO_2X$ groups.

Preference is given to fibre-reactive azo dyestuffs of the formulae

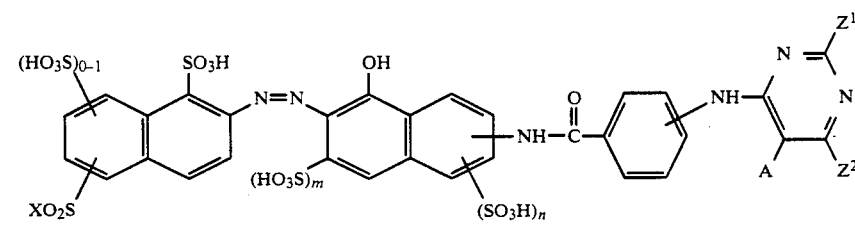

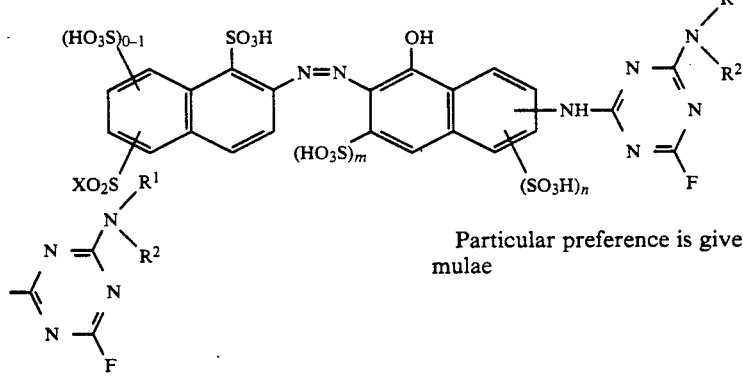

Particular preference is given to dyestuffs of the formulae

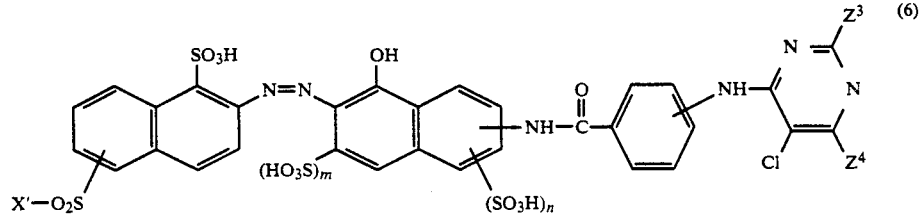

and

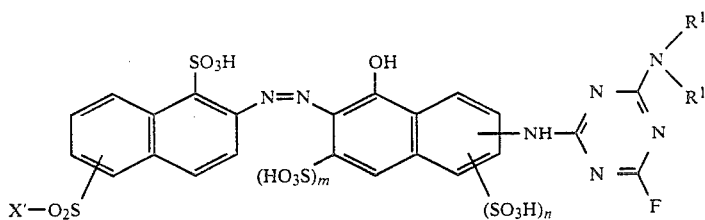

wherein
X' denotes vinyl or CH₂CH₂OSO₃H and
Z³, Z⁴ independently of each other denote Cl or F.
Of particular note are dyestuffs of the formulae (8) to (16) in which D stands for

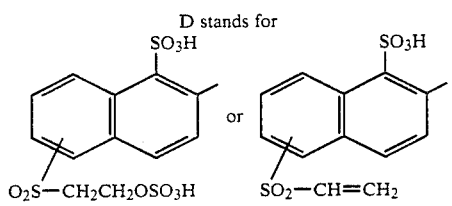

and W' stands for

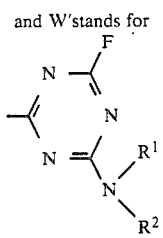

where R¹ and R² have the meaning indicated in the formula (1):

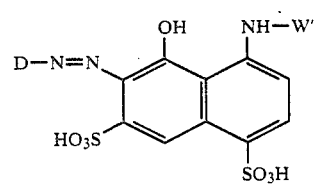  (8)

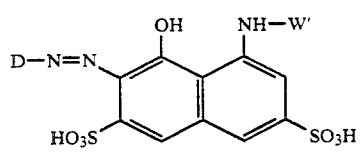  (9)

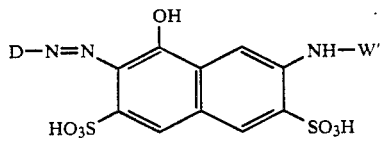  (10)

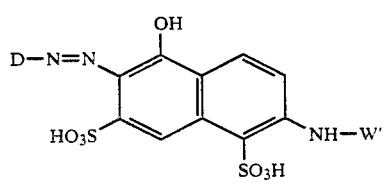  (11)

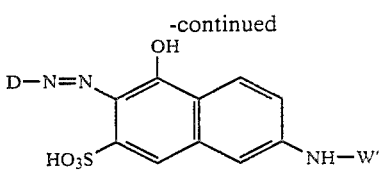  (12)

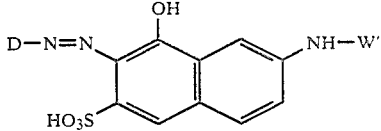  (13)

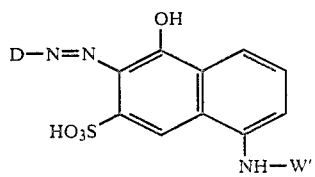  (14)

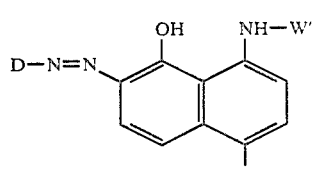  (15)

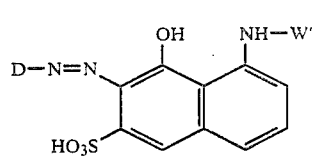  (16)

Of the dyes (8) to (16), those where R²=R¹ are very generally preferred.

The new dyestuffs are suitable for dyeing and printing hydroxyl- and amido-containing materials, in particular cellulose materials. They are notable for a high reactivity and a high degree of fixation. The dyeings or prints obtainable with these dyestuffs on cellulose materials are also notable for a high fibre-dyestuff bond stability and for an excellent stability to oxidizing agents, such as peroxide- or chlorine-containing detergent compositions. The wash-off properties in respect of the hydrolysis products, formed only to a small extent in the course of dyeing or printing, are excellent. The dyestuffs have good wet fastness properties.

The dyestuffs according to the invention are accessible by the methods of preparation customary in the synthesis of reactive dyestuffs.

For instance, by diazotization of amines of the formula

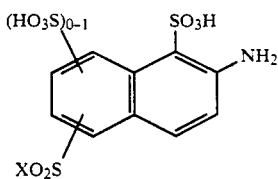

and coupling of the resulting diazonium compounds with hydroxynaphthalenesulphonic acids of the formula (18)

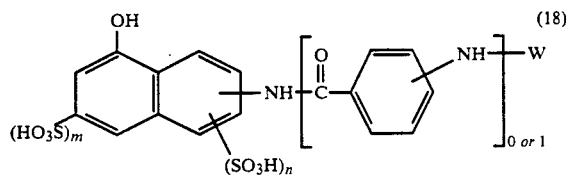

The intermediates (18) are prepared for example by condensing aminonaphthol-monosulphonic or -disulphonic acids or (aminobenzoyl)aminonaphthol-monosulphonic or -disulphonic acids at the amine function by known methods (for example EP 40 806, DOS 27 11 150, EP 172 790, DOS 27 47 011) with trifluorotriazine and reacting the resulting difluorotriazinyl compounds with amines HNR¹R² in the presence of acid-binding agents or else condensing them with halogen-containing pyrimidines (cf. EP 69 703, DOS 2 623 252, EP 133 843).

Details are revealed in the Examples the which follow. Examples of the diazo components (17) are:
2-amino-6-(2-sulphatoethylsulphonyl) (or vinylsulphonyl)naphthalene-1-sulphonic acid
2-amino-5-(2-sulphatoethylsulphonyl) (or vinylsulphonyl)naphthalene-1-sulphonic acid
2-amino-5-(2-sulphatoethylsulphonyl) (or vinylsulphonyl)naphthalene-1,7-disulphonic acid.

A further way of preparing the dyestuffs of formula (1) consists in subjecting the conventionally (by diazotization and coupling) prepared dyestuff of the formula at the amine function either to condensation with trifluorotriazine and subsequently with amines HNR¹R² or else to reaction by known methods with halogen-containing pyrimidines.

The indicated formulae are those of the free acids. The preparation generally gives the salts, in particular the alkali metal salts, such as sodium, potassium or lithium salts.

EXAMPLE 1

44.2 g of the monosodium salt of 2-amino-6-(2-sulphatoethyl)sulphonyl-1-naphthalenesulphonic acid are suspended in 300 ml of water and 30 ml of concentrated hydrochloric acid and admixed with 100 g of ice. At 5° to 10° C. 25 ml of a 30% strength sodium nitrite solution are added speedily and stirred for 30 minutes. The excess nitrite is removed by addition of a few ml of amidosulphuric acid solution. This diazotization mixture is metered into a neutral solution of 58.7 g of a compound of the formula

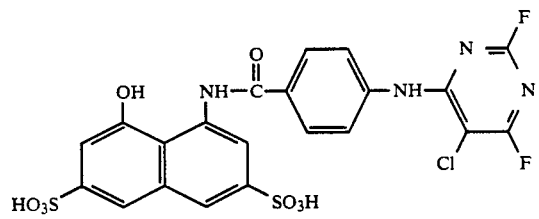

in 300 ml of water while the pH is maintained at a constant 7.0 to 7.5 with 20% strength sodium carbonate solution. This is followed by one hour of stirring, salting out with 70 g of sodium chloride and filtering off with suction. Drying leaves 112 g of a dark red powder.

The isolated dyestuff has the formula

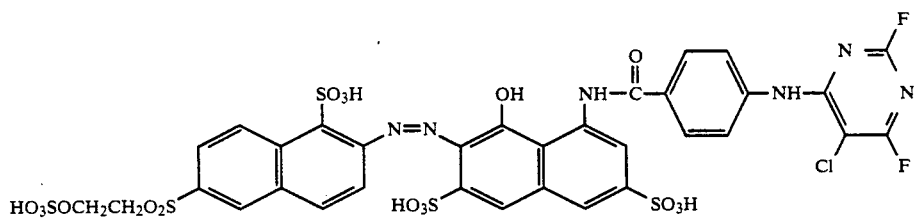

and dyes cotton in a brilliant bluish red shade ($\lambda_{max}$=520; 542 nm (in H$_2$O)).

EXAMPLE 2

Replacing in Example 1 the reactive-group-containing coupling component by the corresponding ortho-linked (2-aminobenzoyl)amino derivative affords a likewise useful red reactive dyestuff of the formula

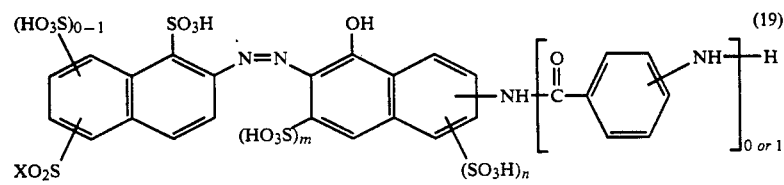

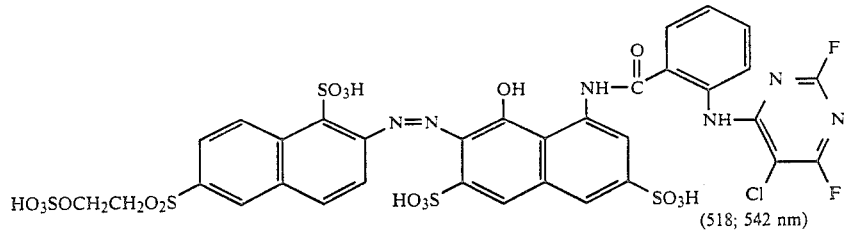

(518; 542 nm)

EXAMPLE 3

Using in Example 1 instead of the diazo component 2-amino-6-(2-sulphatoethyl)sulphonyl-1-naphthalenesulphonic acid in this case 2-amino-5-(2-sulphatoethyl)-sulphonyl-1-naphthalenesulphonic acid the result is a dyestuff of the formula

EXAMPLE 7

31.8 g of 8-amino-1-hydroxy-3,6-naphthalenedisulphonic acid are condensed at 40° to 45° C. and pH 4.0 to 5.5 with 22 g of 2,4,5,6-tetrachloropyrimidine, and the condensation product is coupled at pH 6 to 7 in the presence of potassium hydrogen carbonate with the

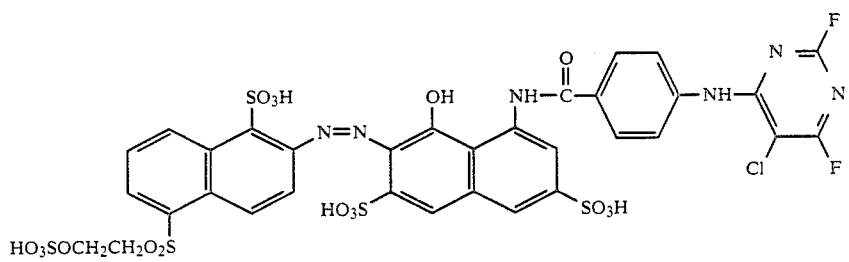

The method of synthesis of Example 1 can also be used to prepare the following fibre-reactive bluish red dyestuffs:

diazonium compound prepared analogously to Example 1 of 2-amino-6-(2-sulphatoethyl)sulphonyl-1-naphthalenesulphonic acid. Isolating and drying leaves a dyestuff of the formula Example 4

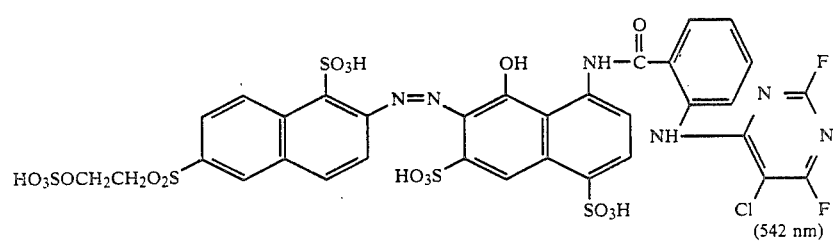

(542 nm)

Example 5

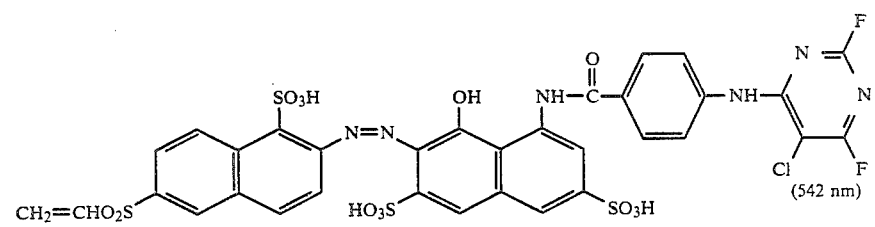

(542 nm)

Example 6

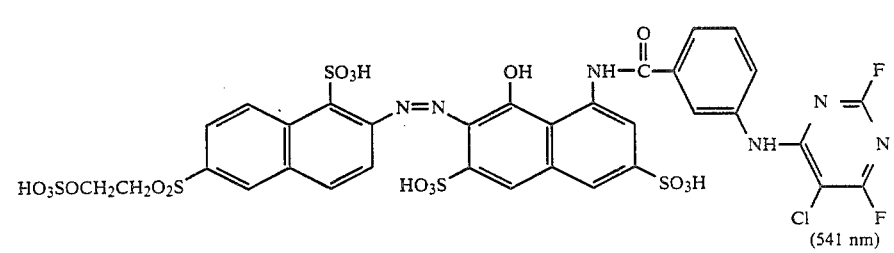

(541 nm)

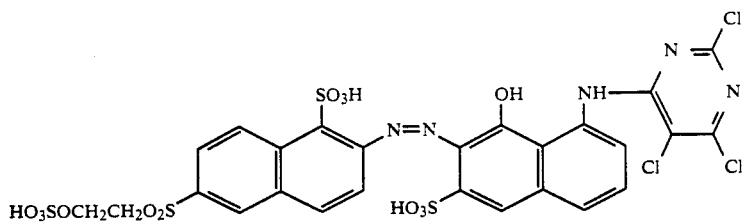

which dyes cotton in bluish red shades (544 nm).

The same method is also used to synthesize the dyestuffs of Examples 8 to 34 below.

TABLE 1

Dyestuffs of the formula

| Example | K | A | $Z^1$ | $Z^2$ | Hue |
|---|---|---|---|---|---|
| 8 | ![K group: OH, NH—, HO3S, SO3H naphthalene] | CN | Cl | Cl | bluish red |
| 9 | " | Cl | F | F | " |
| 10 | " | Cl | H | F | " |
| 11 | " | Cl | F | $SO_2CH_3$ | " |
| 12 | " | H | Cl | Cl | " |
| 13 | " | $SO_2CH_3$ | F | F | " |
| 14 | " | Br | F | F | " |
| 15 | ![K group: OH, NH—, HO3S, SO3H naphthalene] | Cl | Cl | Cl | " |
| 16 | ![K group: OH, NH—, HO3S, SO3H naphthalene] | Cl | F | F | bluish red |
| 17 | " | Cl | H | F | " |
| 18 | " | CN | Cl | Cl | " |
| 19 | ![K group: OH, NH—, HO3S, SO3H naphthalene] | Cl | Cl | Cl | red |
| 20 | " | Cl | F | F | " |

TABLE 1-continued

Dyestuffs of the formula

[Structure: naphthalene with SO₃H, HO₃SOCH₂CH₂O₂S substituents, N=N-[K]-group connected to pyrimidine ring with Z¹, Z², and A substituents]

| Example | K | A | Z¹ | Z² | Hue |
|---------|---|---|----|----|-----|
| 21 | [4-OH, 3-CH₃, 6-HO₃S, 8-SO₃H, 7-NH– naphthalene] | Cl | Cl | Cl | scarlet |
| 22 | " | Cl | F | F | " |
| 23 | [1-OH, 2-CH₃, 3-HO₃S, 7-NH– naphthalene] | Cl | Cl | Cl | red |
| 24 | " | Cl | F | F | " |
| 25 | " | Cl | H | F | " |
| 26 | " | CN | Cl | Cl | " |
| 27 | [4-OH, 3-CH₃, 6-HO₃S, 7-NH– naphthalene] | Cl | Cl | Cl | orange |
| 28 | " | Cl | F | F | " |
| 29 | " | Cl | H | F | " |
| 30 | " | CN | Cl | Cl | " |
| 31 | [1-OH, 2-CH₃, 3-HO₃S, 5-NH– naphthalene] | Cl | F | F | red |
| 32 | [1-OH, 2-CH₃, 3-HO₃S, 8-NH– naphthalene] | Cl | Cl | Cl | bluish red |
| 33 | " | Cl | F | F | " |
| 34 | [1-OH, 2-CH₃, 8-NH–, 5-SO₃H naphthalene] | Cl | F | F | " |

EXAMPLE 35

34.1 g of the monosodium salt of 1-hydroxy-8-aminonaphthalene-3,6-disulphonic acid are suspended in 150 ml of water under an $N_2$ protective gas atmosphere and dissolved by the addition of 7.7 g of 2-(N-methylamino)ethanol (pH 6.5). 5 g of sodium fluoride are added, and the solution is cooled to 0° C. by the addition of 100 g of ice. 8.8 ml of trifluorotriazine are added, and the pH drops to 4.5. The pH is maintained at a constant 4.5 with about 5 ml of 20% strength sodium carbonate solution. After 10 minutes at 0° to 5° C. the pH is raised in the course of a further 10 minutes to 6.5 to 7.0 by the dropwise addition of sodium carbonate solution. Thereafter the twofold condensation product of the formula

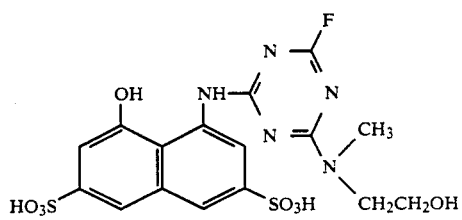

crystallizes out. Into this mixture is then metered the diazonium compound prepared analogously to Example 1 of 2-amino-6-(2-sulphatoethyl)sulphonyl-1-naphthalenesulphonic acid, and the pH is maintained at a constant 6.5 to 7.5 with sodium carbonate solution. The dyestuff which has the structure

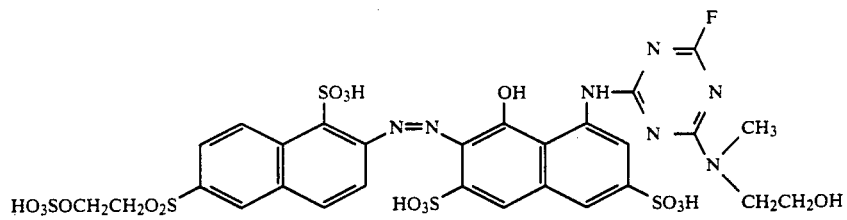

is salted out with 70 g of sodium chloride and 70 g of potassium chloride, isolated and dried. It dyes cotton in brilliant bluish red shades ($\lambda_{max}$=518; 544 (sh) nm).

EXAMPLE 36

Replacing in Example 35 2-amino-6-(2-sulphatoethyl)sulphonyl-1-naphthalenesulphonic acid by 2-amino-5-(2-sulphatoethyl)sulphonyl-1-naphthalenesulphonic acid affords a likewise useful red dyestuff of the formula

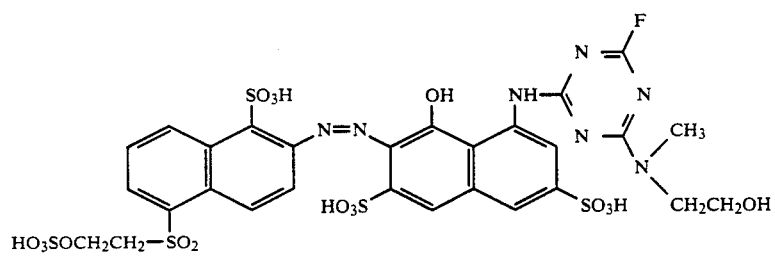

By varying the coupling component or the aliphatic amine in Example 35 the abovementioned procedure makes it possible to obtain the dyestuffs of Examples 37 to 102:

TABLE 2

Dyestuffs of the formula

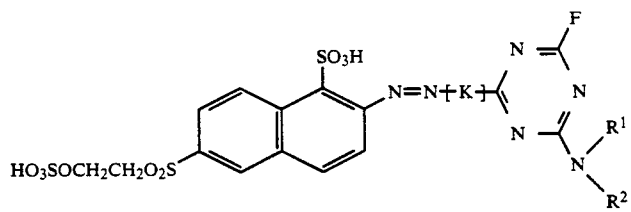

| Example | K | R1 | R2 | Hue |
|---|---|---|---|---|
| 37 | OH, NH—, HO3S, SO3H | H | H | bluish red |
| 38 | " | H | CH3 | " |
| 39 | " | H | CH2CH3 | " |
| 40 | " | H | CH2CH2OH | " |
| 41 | " | H | CH2CH2OCH3 | " |
| 42 | " | CH3 | CH3 | " |

TABLE 2-continued

Dyestuffs of the formula $$\text{[Naphthalene with } SO_3H, \text{ } HO_3SOCH_2CH_2O_2S\text{ substituents]}-N=N-[K]-\text{[triazine ring with F, } NR^1R^2\text{]}$$

| Example | K | R¹ | R² | Hue |
|---|---|---|---|---|
| 43 | 1-OH, 8-NH–, 3-SO₃H, 6-HO₃S, 2-CH₃ naphthalene | C₂H₅ | C₂H₅ | bluish red |
| 44 | " | CH₃ | CH₂SO₃H | " |
| 45 | " | CH₃ | CH₂CH₂CN | " |
| 46 | " | H | (CH₂)₂—CH₃ | " |
| 47 | " | H | (CH₂)₃—CH₃ | " |
| 48 | " | H | C(CH₃)₃ | " |
| 49 | " | H | CH₂CO₂H | " |
| 50 | " | H | (CH₂)₃—N(CH₃)₂ | " |
| 51 | " | H | (CH₂)₂—SO₂CH₂CH₂Cl | " |
| 52 | [same K as 43] | H | (CH₂)₂—O—(CH₂)₂—SO₂—CH=CH₂ | bluish red |
| 53 | " | CH₂CH₂OH | CH₂CH₂OH | " |
| 54 | " | H | CH₂—CH(OH)—CH₃ | " |
| 55 | " | (CH₂)₂—SO₂CH₂CH₂Cl | (CH₂)₂—SO₂CH₂CH₂Cl | " |
| 56 | " | H | cyclohexyl | " |
| 57 | " | H | —CH₂—C₆H₅ (benzyl) | " |
| 58 | " | H | cyclopropyl | " |
| 59 | 1-OH, 8-NH–, 3-SO₃H, 6-HO₃S, 2-CH₃ naphthalene | H | NH₂ | bluish red |
| 60 | " | H | N(CH₃)₂ | " |
| 61 | 1-OH, 8-NH–, 5-SO₃H, 7-HO₃S, 2-CH₃ naphthalene | H | C₂H₅ | " |
| 62 | " | C₂H₅ | C₂H₅ | " |
| 63 | " | CH₃ | CH₂CH₂OH | " |
| 64 | " | H | CH₂CH₂CH₂OH | " |

TABLE 2-continued

Dyestuffs of the formula

[Structure: naphthalene with SO₃H and HO₃SOCH₂CH₂O₂S substituents, linked via -N=N-K- to a triazine bearing F and NR¹R²]

| Example | K | R1 | R2 | Hue |
|---|---|---|---|---|
| 65 | " | H | CH₂CH₂OCH₃ | " |
| 66 | [4-hydroxy-3-methyl-8-amino-naphthalene-6-sulfo-1-sulfonic acid coupler] | H | (CH₂)₃—OCH₃ | bluish red |
| 67 | " | H | CH₂CH₂SO₃H | " |
| 68 | " | H | CH₂CH₂OH | " |
| 69 | " | H | CH₂CH(CH₃)₂ | " |
| 70 | " | CH₂CH₂OH | CH₂CH₂OH | " |
| 71 | " | CH₂CH₂OH | cyclohexyl | " |
| 72 | [5-hydroxy-6-methyl-7-amino-naphthalene-2,7-disulfonic acid coupler] | CH₃ | CH₃ | bluish red |
| 73 | " | CH₃ | CH₂CH₂OH | " |
| 74 | " | H | (CH₂)₃—OCH₃ | " |
| 75 | [4-hydroxy-3-methyl-7-amino-naphthalene-6,8-disulfonic acid coupler] | H | H | scarlet |
| 76 | " | H | C₂H₅ | " |
| 77 | " | CH₃ | CH₂CH₂OH | " |
| 78 | " | H | CH₂CH₂OCH₃ | " |
| 79 | " | CH₃ | cyclohexyl | " |
| 80 | [4-hydroxy-3-methyl-7-amino-naphthalene-6-sulfonic acid coupler] | H | CH₂CH₂OH | red |
| 81 | " | CH₃ | CH₂CH₂OH | " |
| 82 | " | CH₃ | CH₂SO₃H | " |
| 83 | " | H | CH₂CH₂OSO₃H | " |
| 84 | " | H | CH₂CH₂OCH₃ | " |
| 85 | " | CH₂CH₂OH | CH₂CH₂OH | " |

TABLE 2-continued

Dyestuffs of the formula

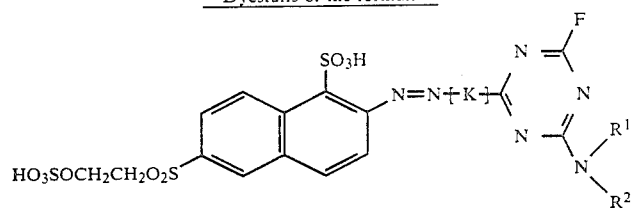

| Example | K | R1 | R2 | Hue |
|---|---|---|---|---|
| 86 | 1-OH, 2-CH₃, 3-SO₃H, 6-NH— naphthalene | H | H | orange |
| 87 | 1-OH, 2-CH₃, 3-SO₃H, 6-NH— naphthalene | CH₃ | H | orange |
| 88 | " | CH₃ | CH₃ | " |
| 89 | " | H | CH₂CH₂OH | " |
| 90 | " | CH₃ | CH₂CH₂OH | " |
| 91 | " | H | CH₂CH₂CH₂OCH₃ | " |
| 92 | " | CH₃ | CH₂CH₂OCH₃ | " |
| 93 | " | CH₃ | CH₂SO₃H | " |
| 94 | " | H | CH₂CH₂SO₃H | " |
| 95 | " | H | CH₂CO₂H | " |
| 96 | 1-OH, 2-CH₃, 3-SO₃H, 6-NH— naphthalene | H | CH₂CH₂CH₂SO₂CH₂CH₂Cl | orange |
| 97 | " | CH₂CH₂SO₂CH₂CH₂Cl | CH₂CH₂SO₂CH₂CH₂Cl | " |
| 98 | " | H | CH₂CH₂CH₂OH | " |
| 99 | " | H | CH₂CH(OH)—CH₃ | " |
| 100 | 1-OH, 2-CH₃, 3-SO₃H, 5-NH— naphthalene | CH₃ | CH₂CH₂OH | red |
| 101 | 1-OH, 2-CH₃, 3-SO₃H, 8-NH— naphthalene | H | CH₂CH₂OH | bluish red |
| 102 | 1-OH, 2-CH₃, 3-NH—, 5-SO₃H naphthalene (8-OH, 7-CH₃... with NH and SO₃H) | CH₃ | CH₂SO₃H | " |

EXAMPLE 103

31.9 g of 1-hydroxy-8-aminonaphthalene-3,6-disulphonic acid are dissolved in 400 ml of water to give a neutral solution. At 0° to 5° C. 8.8 ml of trifluorotriazine are added, and a pH of 4.0 to 4.5 is maintained by addition of 20% strength sodium carbonate solution. After 5 minutes 15.5 g of 4-(2′-hydroxyethoxy)aniline are added, and the reaction mixture is maintained at 10° C. for 10 minutes until the reaction has ended. The resulting reaction mixture of the compound of the formula

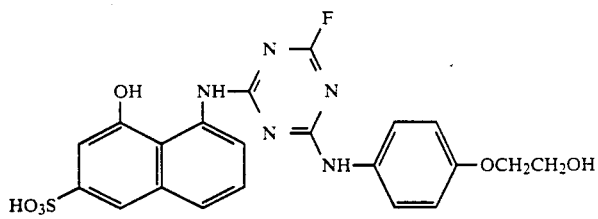

is coupled at 5° C. with a diazonium salt suspension prepared according to Example 1 of 2-amino-6-(2-sulphatoethyl)sulphonyl-1-naphthalenesulphonic acid. At the same time the pH is maintained at 7.0 to 7.5 with sodium carbonate solution. The dyestuff of the formula is salted out, filtered off with suction, dried and ground. The dark red dyestuff powder dyes cotton in a brilliant bluish red (546 nm).

By varying the coupling component or the amine component the procedure of Example 103 makes it possible to obtain the dyestuffs of the following Examples 103 to 138:

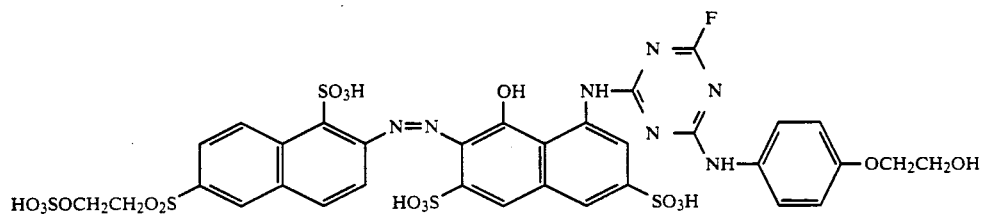

TABLE 3

Dyestuffs of the formula

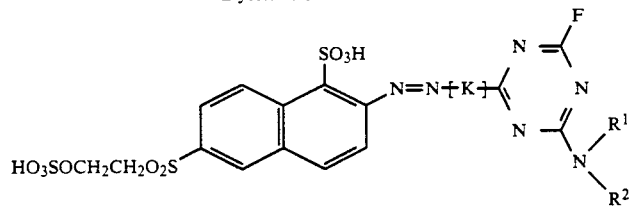

| Example | K | R1 | R2 | Hue |
|---|---|---|---|---|
| 104 | OH, NH—, HO3S, SO3H (naphthalene) | H | phenyl | bluish red |
| 105 | " | CH3 | phenyl | " |
| 106 | " | H | 4-Cl-phenyl | " |
| 107 | OH, NH—, HO3S, SO3H (naphthalene) | H | 3-Cl-phenyl | bluish red |
| 108 | " | CH2CH2OH | phenyl | " |

TABLE 3-continued

Dyestuffs of the formula

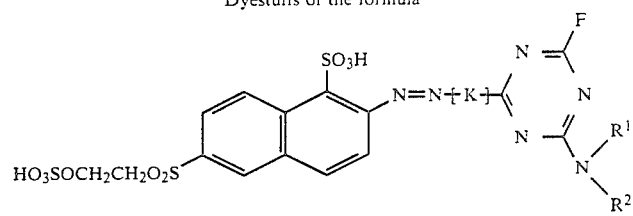

| Example | K | R1 | R2 | Hue |
|---|---|---|---|---|
| 109 | " | H | ![p-tolyl] | " |
| 110 | " | H | ![p-methoxyphenyl] | " |
| 111 | " | H | ![o-methoxyphenyl] | " |
| 112 | ![1-amino-8-hydroxy-naphthalene-3,6-disulfonic acid] | H | ![2-methyl-4-methoxyphenyl] | bluish red |
| 113 | " | H | ![2,4-dimethoxyphenyl] | " |
| 114 | " | H | ![o-carboxyphenyl] | " |
| 115 | " | H | ![6-sulfo-2-naphthyl] | " |
| 116 | ![1-amino-8-hydroxy-naphthalene-3,6-disulfonic acid] | H | ![naphthalene-1,5-disulfonic acid substituent] | bluish red |
| 117 | " | H | ![5-sulfo-1-naphthyl] | " |

TABLE 3-continued

Dyestuffs of the formula

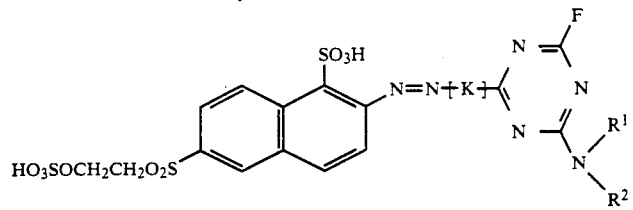

| Example | K | R1 | R2 | Hue |
|---|---|---|---|---|
| 118 | " | H | 5-methyl-naphthalene-1,3-disulfonic acid group | " |
| 119 | 1-hydroxy-8-amino-3,6-disulfo-2-methyl-naphthalene (H-acid type) | H | 6-methyl-2-(β-sulfatoethylsulfonyl)naphthyl | bluish red |
| 120 | " | H | 6-methyl-naphthyl with 1-SO$_3$H and 3-SO$_2$CH$_2$CH$_2$OSO$_3$H | " |
| 121 | " | H | 6-methyl-naphthyl with 1-SO$_2$CH$_2$CH$_2$OSO$_3$H and 3-SO$_3$H | " |
| 122 | " | H | 2-methyl-naphthyl with 1-SO$_3$H and 6-SO$_2$CH$_2$CH$_2$OSO$_3$H | bluish red |
| 123 | " | H | phenyl | " |
| 124 | " | —CH$_2$CH$_3$ | phenyl | " |
| 125 | " | —CH$_2$CH$_2$OH | phenyl | " |

TABLE 3-continued

Dyestuffs of the formula

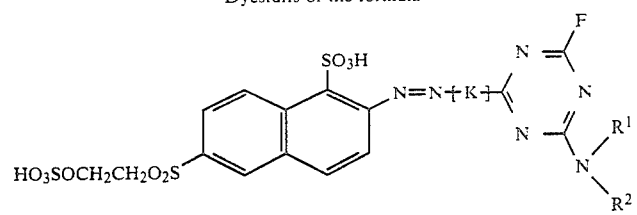

| Example | K | R1 | R2 | Hue |
|---|---|---|---|---|
| 126 | 4-hydroxy-3-methyl-6-(NH—)-2-naphthalenesulfonic acid (HO₃S, OH, NH—) | H | —C₆H₄—OCH₂CH₂OH (para) | red |
| 127 | " | CH₂SO₃H | —C₆H₅ | " |
| 128 | " | H | —C₆H₄—CO₂H (para) | " |
| 129 | " | H | naphthalene-1,3-disulfonic acid-7-yl (SO₃H, SO₃H) | " |
| 130 | " | H | naphthalene-1,4-disulfonic acid-yl (SO₃H, SO₃H) | " |
| 131 | 4-hydroxy-3-methyl-6-(NH—)-2-naphthalenesulfonic acid | H | —C₆H₄—OCH₃ (para) | orange |
| 132 | " | CH₂CH₂OH | —C₆H₅ | " |
| 133 | " | H | —C₆H₄—CO₂H (ortho) | " |
| 134 | " | H | naphthalene-6-sulfonic acid-2-yl | " |

TABLE 3-continued

Dyestuffs of the formula

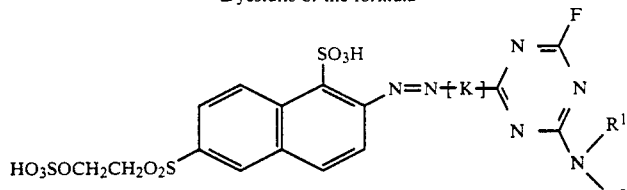

| Example | K | R1 | R2 | Hue |
|---|---|---|---|---|
| 135 | " | H | (7-methylnaphthalene-1,5-disulfonic acid residue) | " |
| 136 | (1-hydroxy-2-methyl-3-sulfo-6-amino-naphthalene residue) | H | (4-hydroxy-6-methyl-3-sulfo-naphthalene residue) | " |
| 137 | (1-hydroxy-2-methyl-3-sulfo-8-(4-aminobenzamido)-naphthalene residue) | $CH_3$ | $CH_2CH_2OH$ | bluish red |
| 138 | (1-hydroxy-2-methyl-3-sulfo-8-(2-aminobenzamido)-naphthalene residue) | $CH_3$ | $CH_2CH_2OH$ | bluish red |

We claim:

1. A fiber-reactive azo dyestuff of the formula

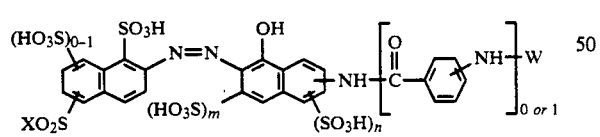 (1)

wherein
m is 0 or 1,
n is 0 or 1, with m+n=1 or 2,
X is vinyl or $CH_2CH_2$—Y,
Y is a radical detachable under alkaline conditions,
W is

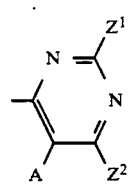 (2)

or

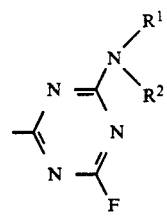 (3)

A is H, Cl, Br, CN or $C_1$–$C_4$-alkylsulphonyl,
$Z^1$ and $Z^2$ each independently is H or F, but $Z^1$ and $Z^2$ do not simultaneously stand for H, is H or a $C_1$–$C_4$-alkyl or cycloaliphatic radical, or a $C_1$–$C_4$-alkyl or cycloaliphatic radical substituted by OH, Cl, Br, F, CN, $CO_2H$, $SO_3H$, $OSO_3H$, $C_1$–$C_4$-alkoxy, $C_1$–$C_4$-alkyl, $N(CH_3)_2$, $NHCOCH_3$, $SO_2X$ or $SO_2X$ substituted-$C_1$–$C_4$-alkoxy, and
$R^2$ is $R^1$ or a benzyl radical or a benzyl radical substituted by OH, Cl, Br, F, $CO_2H$, $SO_3H$, $SO_2X$ or an amino group.

2. A dyestuff according to claim 1, of the formula

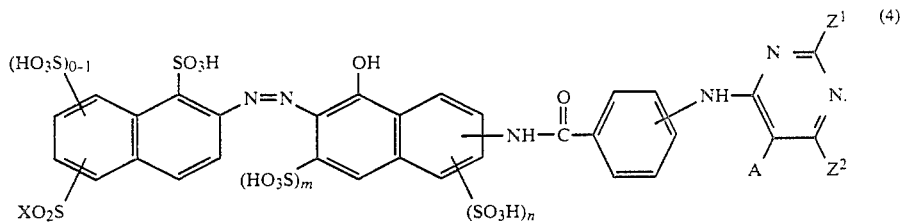
3. A dyestuff according to claim 1, of the formula
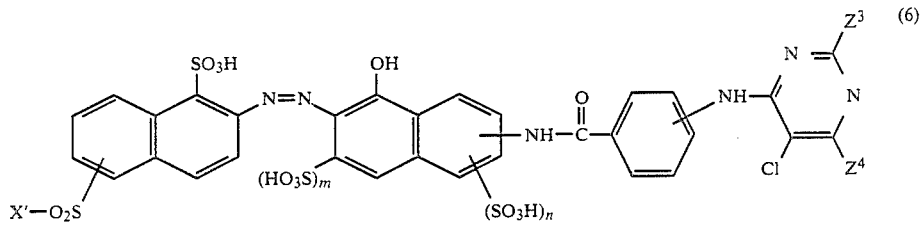
wherein
X' is vinyl or $CH_2CH_2OSO_3H$.
4. A dyestuff according to claim 1, of the formula
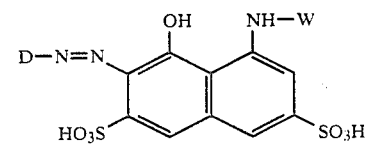  (9)
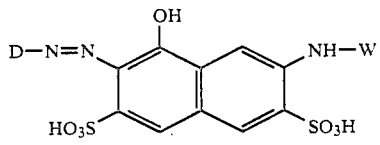  (10)
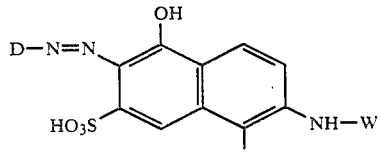  (11)
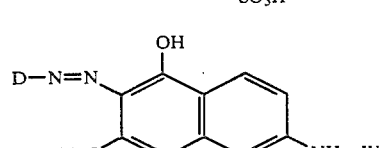  (12)
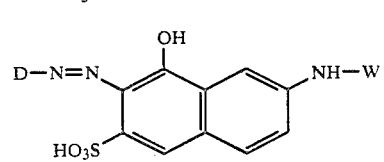  (13)
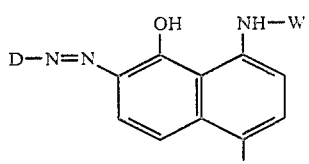  (14)
or
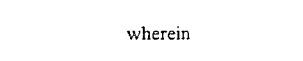  (15)
wherein
D stands for
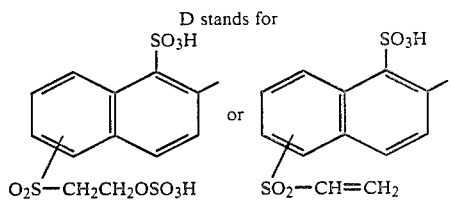
and W stands for
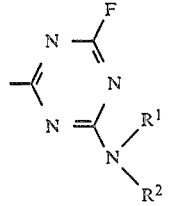
* * * * *

UNITED STATES PATENT AND TRADEMARK OFFICE
CERTIFICATE OF CORRECTION

PATENT NO. : 5,093,481

DATED : March 3, 1992

INVENTOR(S) : Henk et al.

It is certified that error appears in the above-identified patent and that said Letters Patent is hereby corrected as shown below:

Col. 30, line 59   Before " is H " insert -- $R^1$ --

Col. 31, claim 3 line 2   Delete "

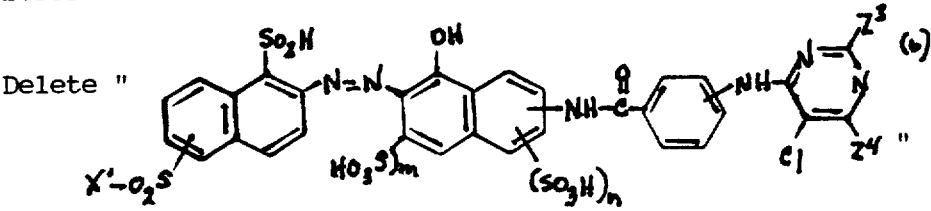

and substitute

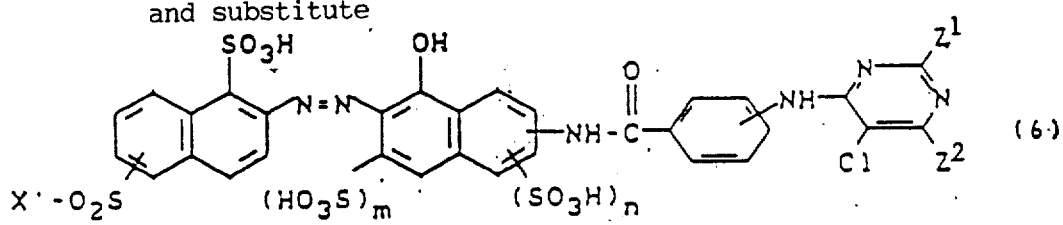

Signed and Sealed this

Tenth Day of August, 1993

Attest:

MICHAEL K. KIRK

*Attesting Officer*   Acting Commissioner of Patents and Trademarks